US005562286A

United States Patent [19]

Brinket

[11] Patent Number: 5,562,286

[45] Date of Patent: Oct. 8, 1996

[54] CASINO GAMING TABLE HAVING A VENTILATING DEVICE FOR REMOVING SMOKE

[76] Inventor: Oscar J. Brinket, 3816 Montego Dr., Huntington Beach, Calif. 92649

[21] Appl. No.: 349,679

[22] Filed: Dec. 5, 1994

[51] Int. Cl.[6] .............................. A63F 9/00; A47B 25/00; B01D 53/00; F24F 7/06

[52] U.S. Cl. .......................... 273/309; 273/287; 454/230; 454/306; 454/338; 131/231; 131/238; 55/385.1; 55/385.8; 55/DIG. 18

[58] Field of Search .................................... 273/309, 292, 273/274, 287; 55/385.1, 385.8, DIG. 18, DIG. 19; 454/230, 306, 338; 131/238, 231

[56] References Cited

U.S. PATENT DOCUMENTS

| | | | |
|---|---|---|---|
| 2,572,120 | 10/1951 | Dixon | 454/230 |
| 3,804,942 | 4/1974 | Kato et al. | |
| 3,807,148 | 4/1974 | Fike et al. | 55/385 |
| 3,812,370 | 5/1974 | LaViolette | 250/527 |
| 3,890,126 | 6/1975 | Joseph | 55/385 |
| 4,043,776 | 8/1977 | Orel | 55/385 G |
| 4,092,136 | 5/1978 | Zimbardi | 55/212 |
| 4,105,015 | 8/1978 | Isom | 126/299 D |
| 4,119,419 | 10/1978 | Passaro et al. | 55/212 |
| 4,161,181 | 7/1979 | Nicks et al. | 131/231 |
| 4,177,045 | 12/1979 | Orel | 55/102 |
| 4,244,710 | 1/1981 | Burger | 55/6 |
| 4,248,162 | 2/1981 | Skeist | 454/230 |
| 4,550,738 | 11/1985 | Estey | 131/236 |
| 4,580,582 | 4/1986 | Grube et al. | 131/231 |
| 4,597,781 | 7/1986 | Spector | 55/126 |
| 4,623,367 | 11/1986 | Paulson | 55/385.8 |
| 4,647,295 | 3/1987 | Christ | 95/284 |
| 4,671,300 | 6/1987 | Grube et al. | 131/231 |
| 4,732,591 | 3/1988 | Tujisawa et al. | 55/279 |
| 4,737,173 | 4/1988 | Kudirka et al. | 55/276 |
| 4,838,910 | 6/1989 | Stollenwerk et al. | 55/385.2 |
| 4,858,627 | 8/1989 | Netschert | 131/329 |
| 4,899,766 | 2/1990 | Ross, Jr. | 131/175 |
| 4,911,191 | 3/1990 | Bain | 134/200 |
| 5,067,394 | 11/1991 | Cavallero | 98/42.03 |
| 5,133,788 | 7/1992 | Backus | 55/467 |
| 5,141,539 | 8/1992 | Hiouani | 55/385.1 |
| 5,160,518 | 11/1992 | Vega, Jr. | 55/385.8 |
| 5,181,883 | 1/1993 | Hofstra et al. | 454/49 |
| 5,230,720 | 7/1993 | Kendall | 55/210 |
| 5,248,323 | 9/1993 | Stevenson | 95/90 |
| 5,259,400 | 11/1993 | Bruno et al. | 131/238 |
| 5,264,015 | 11/1993 | Matsui | 55/467 |
| 5,300,139 | 4/1994 | Lin | 96/135 |
| 5,331,886 | 7/1994 | Basel | 99/446 |
| 5,342,238 | 8/1994 | Segerpalm et al. | 454/136 |
| 5,348,563 | 9/1994 | Davis | 55/385.2 |
| 5,353,814 | 10/1994 | Martin | 131/215.2 |
| 5,417,433 | 5/1995 | Phillips | 273/309 |
| 5,441,279 | 8/1995 | Messina | 273/309 |

*Primary Examiner*—Benjamin H. Layno
*Attorney, Agent, or Firm*—Price, Gess & Ubell

[57] ABSTRACT

The present invention provides a smoke-eliminating device of simple construction which can easily be installed onto a preexisting casino gaming table. The fan for circulating air during the purification process is located beneath the gaming table to thereby reduce noise and increase the amount of usable area surrounding the gaming device. The smoke-eliminating device of the present invention is placed between the outer edge of the gaming table and a padded rim above this outer edge. Spaces are placed between the padded rim and the outer edge of the gaming table, to thereby vertically raise the padded edge. The space created between the padded rim and the gaming table is filled with intake vents and the spacers. An air circulator and purifying device is located beneath the table and conduit connects the intake vents to the air circulator and purifying device. The intake vents thus remove cigarette smoke from near the gaming table, purify the air, and release the purified air beneath the gaming table.

21 Claims, 4 Drawing Sheets

CASINO GAMING TABLE HAVING A VENTILATING DEVICE FOR REMOVING SMOKE

BACKGROUND OF THE INVENTION

1. Field of the Invention

The present invention relates generally to devices for removing and purifying smoke and, more particularly, relates to a gaming device having a smoke removing and air purifying device located therewith.

2. Description of Related Art

Gambling devices are often filled with secondhand smoke. It is well established that this secondhand smoke presents a health hazard. Nonsmokers, in particular, are often reluctant to assume this health hazard. Accordingly, a problem exists in the prior art of providing gambling casinos which can accommodate smokers and nonsmokers as well.

Prior art devices exist for removing smoke and for purifying the air. None of the prior art devices are specifically tailored for use in a gambling casino. In particular, air purifying and smoke filtering apparatuses are often bulky, burdensome, and aesthetically unappealing. For example, the Smoke Filtering Apparatus of Hiouani, U.S. Pat. No. 5,141,539; and the Air Purifying Side Table of Kendall, U.S. Pat. No. 5,230,720, are both inappropriate for use in a gambling casino. Either of these two devices, if placed on a gaming table, would consume valuable playing space and/or obstruct a player's vision. Moreover, air purifying devices in the prior art are often difficult to install.

SUMMARY OF THE INVENTION

The present invention provides a smoke-eliminating device of simple construction which can easily be installed onto a preexisting gaming table. The fan for circulating air during the purification process is located beneath the gaming table to thereby reduce noise and increase the amount of usable area surrounding the gaming device. The smoke-eliminating device of the present invention is placed between the outer edge of the gaming table and a padded rim above this outer edge. Spacers are placed between the padded rim and the outer edge of the gaming table, to thereby vertically raise the padded edge. The space created between the padded rim and the gaming table is filled with intake vents and the spacers. Conduits connects the intake vents to the air circulator and purifying device beneath the table. The air circulator and purifying device preferably sets on the floor, but can be fastened to the bottom surface of the gaming table if desired. The intake vents thus remove cigarette smoke from near the gaming table, conduct the smoke laden air to the purifying device to purify the air, and release the purified air beneath the gaming table.

A screen is preferably placed over the intake vents to prevent unwanted items from being pulled into the conduit. A prefilter is normally located within the purifying device, but may be placed between the screen and the intake vent to provide a first filtering stage before the air circulator and purifying means further purifies the air taken in through the intake vents.

The configuration of the present invention may be used in connection with numerous other gaming devices, such as a slot machines. When configured for slot machines, the intake vents are placed above and to the sides of the slot machines, and conduit connected to the intake vents is routed to an area behind the slot machine, where the air-circulating and purifying device is installed. Secondhand smoke from a user of the gaming device is drawn into the intake vents and purified, thus rendering the air in the gambling casino more desirable to nonsmokers.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically.

Figure 1:
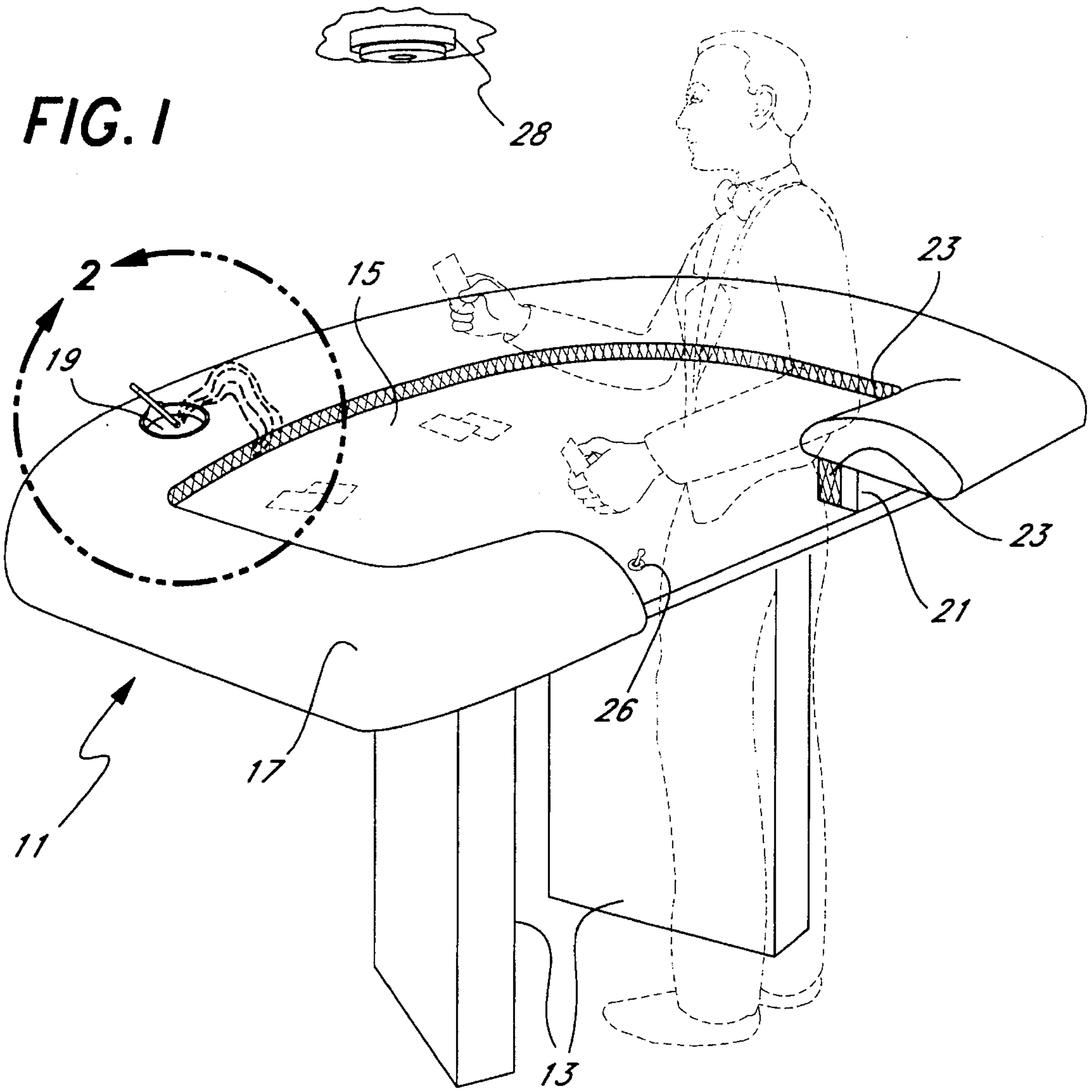
FIG. 1 is a perspective view of the smokeless gaming table of the presently preferred embodiment.

Turning to FIG. 1, the smokeless gaming table 11 of the presently preferred embodiment is shown. The smokeless gaming table 11 comprises two legs 13 which support the smokeless gaming table 11 above a horizontal surface. A playing surface 15 is connected to the legs 13 and provides a surface upon which games may be played. The playing surface 15 may be covered with green felt, for example, for aesthetic purposes and to accommodate the playing of card games.

The rim 17 surrounds the playing surface 15. In the presently preferred embodiment, the rim 17 comprises a cushion with ashtrays 19 located therein. In an alternative embodiment, the rim 17 may comprise a railing.

The smoke-eliminating device of the presently preferred embodiment can be installed on an existing gaming table by raising the rim 17 above the playing surface 15. In the presently preferred embodiment, the rim 17 is vertically raised approximately 1-½ inches above the playing surface 15 with spacers 21. A decorative screen 23 is placed between the playing surface 15 and the rim 17. The air purifier 31 (FIG. 3) can be activated either manually by switch 26 or, alternatively, automatically by smoke sensor 28, to thereby remove smoke 25 from a cigarette 24. Smoke sensor 28 may be located overhead of the table or even on the surface of the table.

Figure 2:
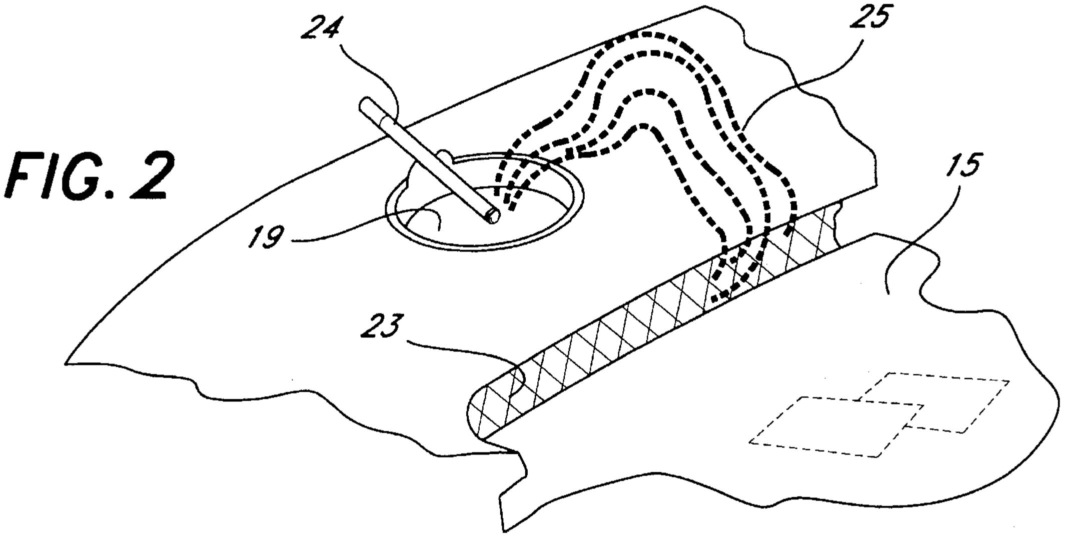
FIG. 2 is a close-up view of the screen and intake vents of the presently preferred embodiment.

FIG. 2 is a close-up view of the ashtray 19 of FIG. 1. Ashtray 19 is depicted as being located on the rim 17 for illustration purposes only. It is understood ashtray 19 or cigarette 24 may be located anywhere in the vicinity of the rim 17 or playing surface 15. In this figure, a cigarette 23 emits smoke 25, which is drawn through the screen 23. The smoke 25 is thus removed from the general vicinity of the playing surface 15, and the quality of the air surrounding the smokeless gaming table 11 is enhanced.

Figure 3:
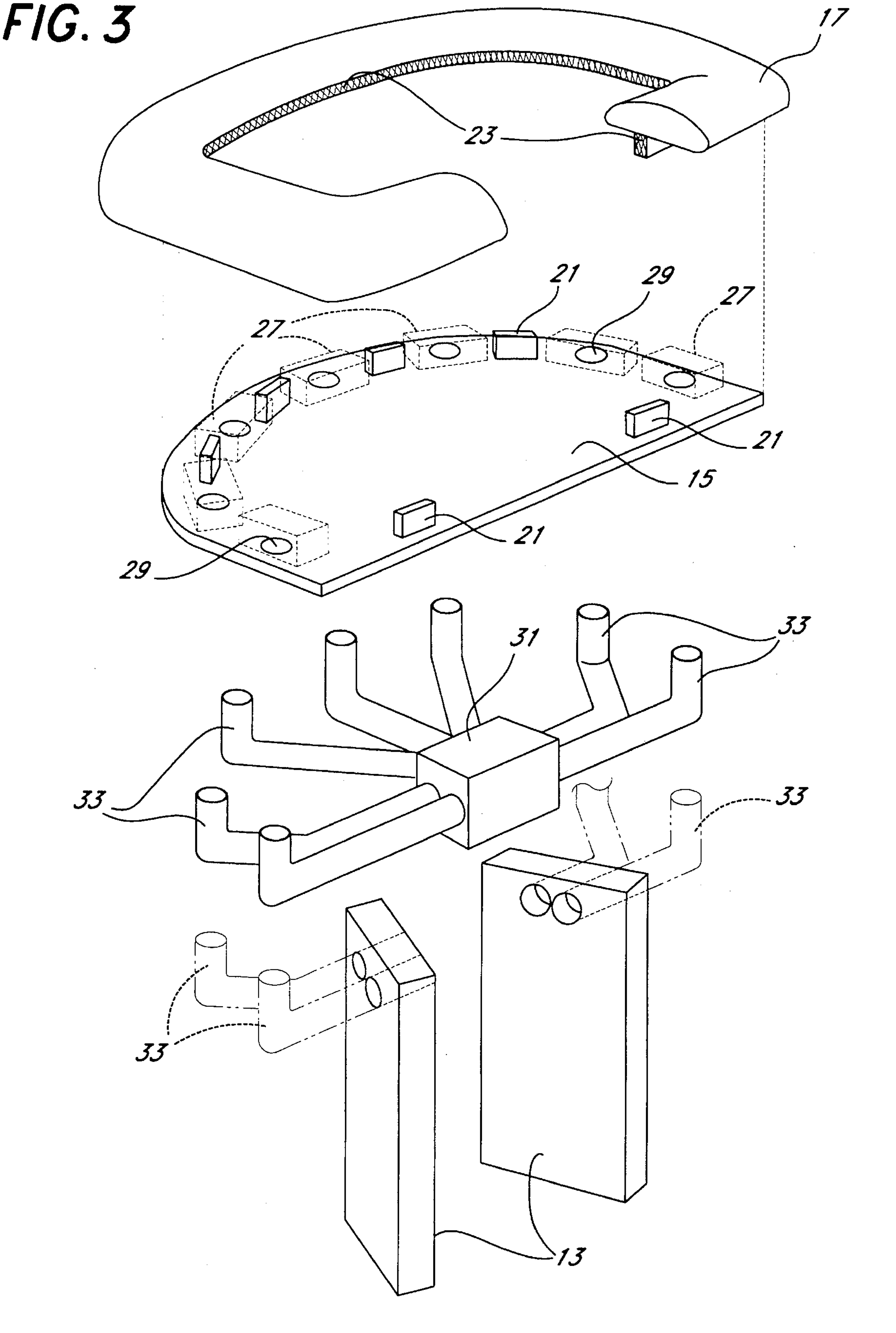
FIG. 3 is an exploded perspective view illustrating the various components of the presently preferred embodiment.

The spacers 21 that are used to raise the rim 17 above the playing surface 15 are shown in FIG. 3. Intake vents 27 are placed between the spacers 21. These intake vents 27 provide a closed environment between openings facing adjacent to screen 23 and apertures 29. Thus, for example, an intake vent 27 has four closed surfaces, one open surface, and one surface with an aperture 29 formed therein. The intake vents 27 thus direct the flow of air from the center of the playing surface 15 through the apertures 29. These intake vents 27, however, may be omitted in simpler configurations.

The simple design of the smoke-eliminating device of the presently preferred embodiment allows the smoke-eliminating device to be installed on an existing gaming table with relative ease. Specifically, the rim 17 is raised; apertures 29 are inserted into the playing surface 15; spacers 21 and intake vents 27 are secured between the playing surface 15 and the rim 17; and the air purifier 31 and conduit 33 are secured beneath the playing surface 15.

The conduit 33 is preferably formed of extruded plastic and is lightweight. The air purifier 31 preferably comprises an air circulator and a filtering system, both of which may be conventionally configured. According to the presently preferred embodiment, conduits connects the intake vents to the air circulator and purifying device beneath the table. Air purifier 31 preferably is placed on the floor beneath the playing surface 15 and between the legs 13 to thereby provide a space-efficient and quiet design. In an alternative embodiment, the air purifier 31 can be fastened beneath the playing surface 15 of the gaming table if desired to provide even more floor space. Apertures 35 may be formed in the legs 13 to accommodate some of the conduit 33 or provide support for the air purifier 31.

Figure 5:
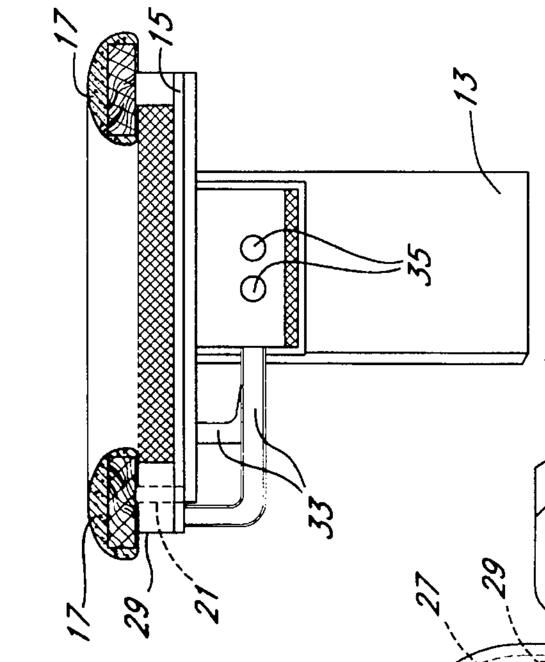
FIG. 5 is a cross-sectional view of the smokeless gaming table of the presently preferred embodiment.
Figure 4:
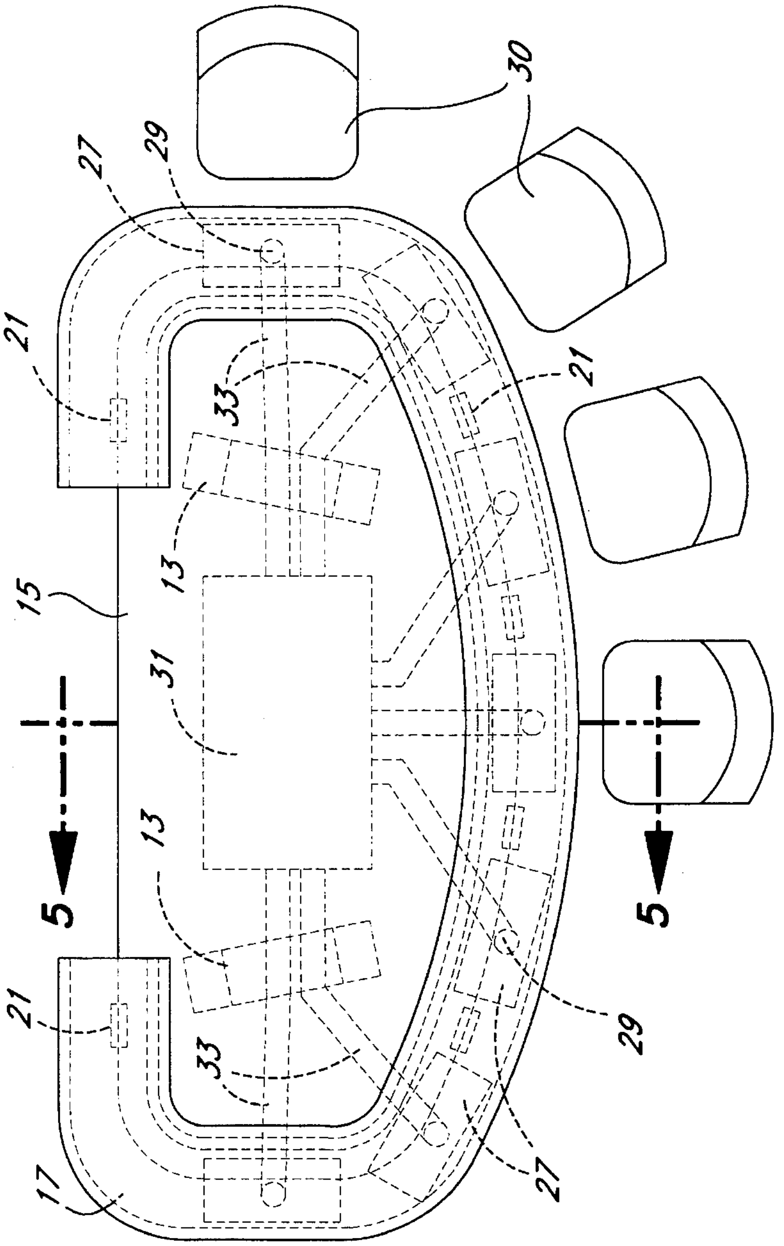
FIG. 4 is a top planar view of the smokeless gaming table of the presently preferred embodiment.

FIG. 4 shows a top planar view of the air purifier 31 supported by the conduit 33. Chairs 30 surround the playing surface 15. FIG. 5 shows a cross-sectional view of the smokeless gaming table 11.

Figure 7:
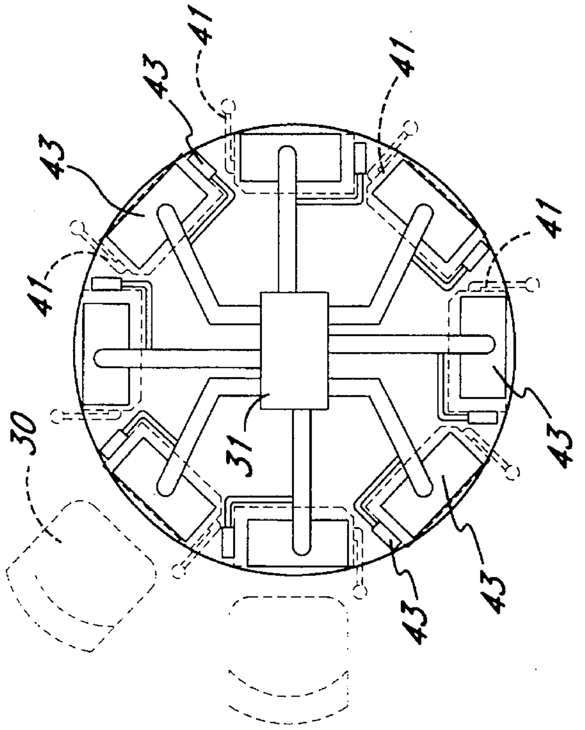
FIG. 7 is a top planar view of the smokeless gaming device according to an alternative embodiment of the present invention.
Figure 6:
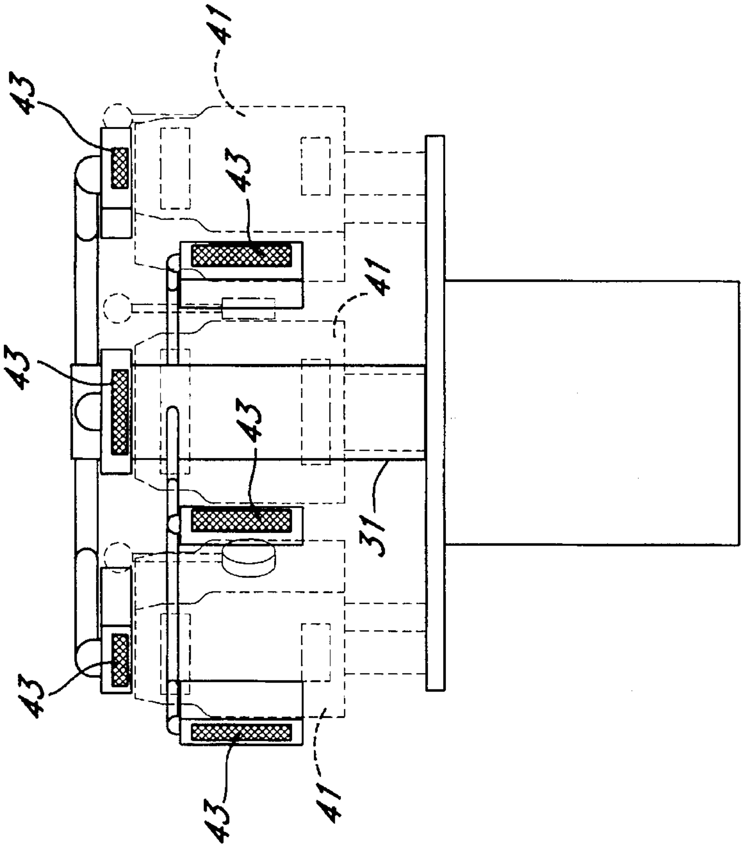
FIG. 6 is a perspective view of a smokeless gaming device according to an alternative embodiment of the present invention.

The smoke-eliminating device of the present invention may be installed on different sizes and designs of gaming devices. For example, the smoke-eliminating device may be installed on a slot machine 41, as shown in FIGS. 6 and 7. Intake vents 43 are positioned above and to the sides of each slot machine 41 to draw smoke from a user smoking a cigarette while using the gaming device. As with the presently preferred embodiment, screens are placed over the intake vents and preliminary filters may be placed between the screens and the intake vents. The air circulating and purifying device may be secured to the back of the slot machine 41 or on the floor behind the slot machine 41, to thereby quietly circulate and purify the secondhand smoke from a user in front of the machine.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A smoke-evacuating system for installation onto a preexisting gaming table, the smoke-evacuating system comprising:

spacers for creating a space between a removable surrounding rim and a playing surface of a gaming table;

enclosed intake vents configured for insertion into the space and spaced apart in the space, the intake vents having two openings, one opening facing a center of the playing surface of the table and one opening for attachment of a conduit;

an air filter; and an air circulator for circulating air through the intake vents, through the attached conduit, and through the air filter in order to evacuate cigarette smoke near the intake vents.

2. The smoke-evacuating system of claim 1, further comprising a screen secured over the intake vents to prevent unwanted items from being drawn into the intake vents.

3. The smoke-evacuating device of claim 2, wherein the air circulator comprises the air filter.

4. The smoke-evacuating device of claim 3, further comprising a prefilter behind the screen.

5. The smoke-evacuating device of claim 1, wherein the air circulator is secured to a bottom surface of a gaming table, and wherein the conduit connects the intake vents to the air circulator.

6. The smoke-evacuating device of claim 1, wherein the air circulator is placed on a floor beneath a gaming table, and wherein the conduit connects the intake vents to the air circulator.

7. A smokeless gaming table, comprising:

a playing surface having a periphery; a removable rim raised above the periphery of the playing surface; a plurality of spacers holding the rim above the periphery; intake vents between the rim and the periphery, each intake vent partially enclosed having a first opening facing a center of the playing surface for air entrance and having a second opening for air egress;

conduit connected to the intake vents by means of the second opening; and an air circulator connected to the conduit, the air circulator drawing air through the intake vents to thereby remove air near the periphery of the playing surface.

8. The smokeless gaming table of claim 7, further comprising a screen secured over the intake vents between the rim and the playing surface, to prevent unwanted items from being drawn into the intake vents.

9. The smokeless gaming table of claim 8, further comprising a prefilter behind the screen.

10. The smokeless gaming table of claim 7, wherein the air circulator comprises an air filter.

11. The smokeless gaming table of claim 7, wherein the air circulator is secured to a bottom surface beneath the playing surface, and wherein the conduit connects the intake vents to the air circulator.

12. The smokeless gaming table of claim 7, wherein the air circulator is placed on a floor beneath the playing surface, and wherein the conduit connects the intake vents to the air circulator.

13. A device for removing smoke from an immediate vicinity of a gaming table, comprising:

a removable rim secured above the gaming table along an outer edge of the gaming table;

enclosed intake vents secured between the rim and the outer edge of the gaming table, the intake vents facing one another with openings facing a center of the table to thereby draw air from the center of the gaming table into the intake vents;

conduit connected to the intake vents, the conduit extending from the intake vents through apertures in the gaming table, and beneath the gaming table; and an air purifier located beneath the gaming table and connected to the conduit, the air purifier drawing air through the intake vents and the conduit to thereby purify the air, the purified air then being emitted beneath the gaming table.

14. The smokeless gaming table of claim 13, further comprising a screen secured over the intake vents to prevent unwanted items from being drawn into the intake vents.

15. The smokeless gaming table of claim 13, further comprising a smoke sensor for detecting smoke and activating the air purifier upon such detection.

16. The smokeless gaming table of claim 13, further comprising a switch to be activated by a user to activate the air purifier.

17. The smokeless gaming table of claim 13, wherein the air purifier is secured to a bottom surface of the gaming table, and wherein the conduit connects the intake vents to the air circulator.

18. The smokeless gaming table of claim 13, wherein the air circulator is placed on a floor beneath the gaming table, and wherein the conduit connects the intake vents to the air circulator.

19. The smokeless gaming table of claim 13, wherein the rim comprises a rail with ashtrays located thereon.

20. The smokeless gaming table of claim 13, wherein the rim comprises a cushion with ashtray holders located therein.

21. A method for retrofitting a preexisting gaming table, having a removable peripheral rim, with a smoke evacuating system comprising the steps of:

removing the rim from the table;

cutting apertures through the table top, the apertures located peripherally and covered by the rim when the rim is installed onto the table;

placing enclosed intake vents peripherally on the table top in communication with the apertures, the intake vents having four closed sides and two open sides facing the table top and center;

reinstalling the rim so as to conceal the intake vents;

providing an air purifier to move air and filter smoke from the air; and connecting the air purifier to the apertures by means of conduits.

* * * * *